(12) United States Patent
Cai et al.

(10) Patent No.: US 12,283,186 B2
(45) Date of Patent: Apr. 22, 2025

(54) VEHICLE DRIVING CONTROL METHOD, STORAGE MEDIUM AND TERMINAL

(71) Applicant: JRD COMMUNICATION (SHENZHEN) LTD., Guangdong (CN)

(72) Inventors: Hai Cai, Guangdong (CN); Liangbo Ge, Guangdong (CN)

(73) Assignee: JRD COMMUNICATION (SHENZHEN) LTD., Guangdong (CN)

( * ) Notice: Subject to any disclaimer, the term of this patent is extended or adjusted under 35 U.S.C. 154(b) by 141 days.

(21) Appl. No.: 17/997,021

(22) PCT Filed: May 28, 2020

(86) PCT No.: PCT/CN2020/092797
§ 371 (c)(1),
(2) Date: Oct. 24, 2022

(87) PCT Pub. No.: WO2021/212602
PCT Pub. Date: Oct. 28, 2021

(65) Prior Publication Data
US 2023/0169859 A1 Jun. 1, 2023

(30) Foreign Application Priority Data
Apr. 24, 2020 (CN) .......................... 202010330085.5

(51) Int. Cl.
*G08G 1/0965* (2006.01)
*G08G 1/0968* (2006.01)
(Continued)

(52) U.S. Cl.
CPC ..... *G08G 1/0965* (2013.01); *G08G 1/096811* (2013.01); *G08G 1/096833* (2013.01);
(Continued)

(58) Field of Classification Search
CPC .......... G08G 1/0965; G08G 1/096811; G08G 1/096833; H04W 4/90; H04W 4/40;
(Continued)

(56) References Cited

U.S. PATENT DOCUMENTS 6,204,755 B1 * 3/2001 Kikuchi ................ G01S 17/931
250/221
10,569,769 B2 2/2020 Ohsugi
(Continued)

FOREIGN PATENT DOCUMENTS

CN 105321364 A 2/2016
CN 105513392 A 4/2016
(Continued)

OTHER PUBLICATIONS

International Search Report in International application No. PCT/CN2020/092797, mailed on Jan. 26, 2021.
(Continued)

*Primary Examiner* — James J Yang
*Assistant Examiner* — Anthony D Afrifa-Kyei
(74) *Attorney, Agent, or Firm* — PV IP PC; Wei Te Chung

(57) ABSTRACT

A vehicle driving control method, comprising: during vehicle driving, acquiring location information of a vehicle for communication within a predetermined distance range (101); determining, based on the location information, a location relationship with the vehicle for communication (102); determining, according to the location relationship, a driving path of the vehicle for communication (103); and sending a communication instruction to the vehicle for communication such that the vehicle for communication drives according to the driving path (104).

20 Claims, 4 Drawing Sheets

(51) Int. Cl.
  *H04W 4/02* (2018.01)
  *H04W 4/40* (2018.01)
  *H04W 4/90* (2018.01)
(52) U.S. Cl.
  CPC ............. *H04W 4/025* (2013.01); *H04W 4/40* (2018.02); *H04W 4/90* (2018.02)
(58) Field of Classification Search
  CPC .. H04W 4/025; B60W 60/0011; B60W 60/00; B60W 60/001; B60W 30/09; B60W 30/0956; B60W 30/12; B60W 30/18163; B60W 40/02; B60W 50/10; B60W 50/12; B60W 60/0015; B60W 60/00274; B60W 2420/403; B60W 2540/20; B60W 2552/10; B60W 2552/30; B60W 2556/45; B60W 2556/50; B60W 2556/55; B60W 2556/60; B60W 2556/65; B60W 30/0953; B60W 30/00; B60W 30/08; B60W 30/095; B60W 30/16; B60W 40/04; B60W 2420/408; B60W 2552/00; B60W 2552/50; B60W 2552/53; G06V 20/58; G06V 20/588; G06V 10/26; G06V 20/56; G01S 19/42; G05D 1/0212
  See application file for complete search history.

(56) References Cited

U.S. PATENT DOCUMENTS

| 2017/0076598 | A1 | 3/2017 | Scofield |
| 2017/0371349 | A1 | 12/2017 | Kim |
| 2018/0037227 | A1* | 2/2018 | D'sa .................... B60W 30/16 |
| 2018/0137756 | A1* | 5/2018 | Moosaei ............ G08G 1/09675 |

FOREIGN PATENT DOCUMENTS

| CN | 105882659 | A | 8/2016 |
| CN | 106781585 | A | 5/2017 |
| CN | 106794839 | A | 5/2017 |
| CN | 206374737 | U | 8/2017 |
| CN | 107458373 | A | 12/2017 |
| CN | 107731010 | A | 2/2018 |
| CN | 107782326 | A | 3/2018 |
| CN | 107851389 | A | 3/2018 |
| CN | 107924623 | A | 4/2018 |
| CN | 108711297 | A | 10/2018 |
| CN | 109116850 | A | 1/2019 |
| CN | 109493591 | A | 3/2019 |
| CN | 109506665 | A | 3/2019 |
| CN | 109671284 | A | 4/2019 |
| CN | 110097774 | A | 8/2019 |
| CN | 110356394 | A | 10/2019 |
| CN | 110503843 | A | 11/2019 |
| CN | 110775041 | A | 2/2020 |
| CN | 111002979 | A | 4/2020 |
| DE | 102014105474 | A1 | 10/2015 |
| JP | 2010237792 | A | 10/2010 |
| WO | WO-2016194997 | A1 * | 12/2016 ............. B60R 25/24 |

OTHER PUBLICATIONS

Written Opinion of the International Search Authority in International application No. PCT/CN2020/092797, mailed on Jan. 26, 2021.

Chinese Office Action issued in corresponding Patent Application No. 202010330085.5 dated Nov. 25, 2020, pp. 1-8.

Chinese Office Action issued in corresponding Patent Application No. 202010330085.5 dated Jul. 5, 2021, pp. 1-8.

European Search Report in European application No. 20931764.3, mailed on Apr. 23, 2024.

* cited by examiner

VEHICLE DRIVING CONTROL METHOD, STORAGE MEDIUM AND TERMINAL

CROSS REFERENCE TO RELATED APPLICATION

This application is a US national phase application based upon an International Application No. PCT/CN2020/092797, filed on May 28, 2020, which claims priority to Chinese Application No. 202010330085.5, filed on Apr. 24, 2020. The entire disclosures of the above applications are incorporated herein by reference.

FIELD OF THE INVENTION

The present disclosure relates to the application field of mobile terminals, more particularly, to a control method for vehicle driving, a device, a storage medium, and a terminal.

BACKGROUND

There are more and more vehicles on the road, making the road more and more congested. Ambulances need to pass through congested roads quickly, saving precious time to save lives. Under the current circumstances, the driver in front hears and sees from the rearview mirror that the ambulance needs to pass through the road section where he is before he starts to observe the actual situation in front of him, on the left, and the right, to perform avoidance behavior.

SUMMARY

Technical Problem

An embodiment of the present disclosure is directed to a control method for vehicle driving, a device, a storage medium, and a terminal, which can solve the problem of low efficiency of travel path planning during vehicle driving in the prior art.

Technical Solution

In a first aspect, an embodiment of the present disclosure is directed to a control method for vehicle driving, comprises:
acquiring a position information of a vehicle to be communicated within a preset distance range during a driving process of the vehicle;
determining a positional relationship with the vehicle to be communicated based on the positional information;
determining a travel path of the vehicle to be communicated according to the positional relationship; and
sending a communication instruction to the vehicle to be communicated, so that the vehicle to be communicated travels according to the travel path.

In a second aspect, an embodiment of the present disclosure is directed to a storage medium, which stores a plurality of instructions, and the instructions are adapted to be loaded by a processor to execute the steps in the above-described vehicle driving control method.

In a third aspect, an embodiment of the present disclosure is directed to a terminal, which comprises a processor and a memory, the memory stores a plurality of instructions, and the processor loads the instructions to execute the steps in the above-described vehicle driving control method.

Advantageous Effect

The solution of the present disclosure acquires the position information of the vehicle ahead in real-time during the driving process of the vehicle and can communicate with the vehicle ahead to change the original travel path in advance when encountering an emergency, thereby effectively improving the driving efficiency of the vehicle while ensuring driving safety.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF THE EMBODIMENTS

To help a person skilled in the art better understand the solutions of the present disclosure, the following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present disclosure.

The embodiments of the present disclosure are directed to a vehicle driving control method, device, storage medium, and terminal, so as to effectively improve the driving efficiency of a vehicle. Each of them will be described in detail below. It should be noted that the description order of the following embodiments is not intended to limit the preferred order of the embodiments.

Figure 1:
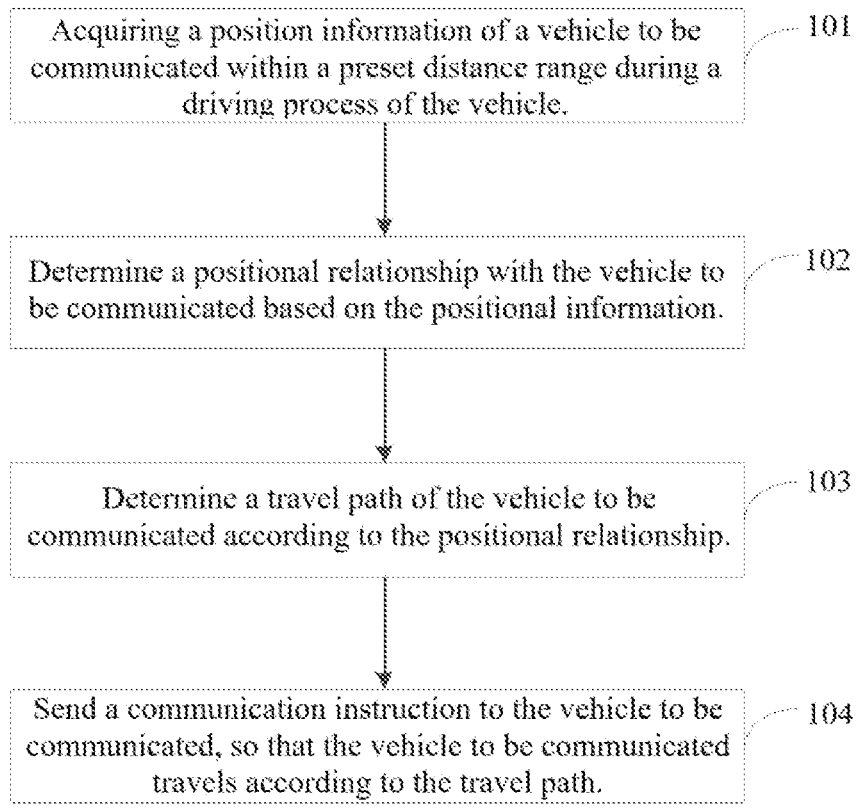
FIG. 1 is a flowchart of a first control method for vehicle driving according to one embodiment of the present disclosure.

Please refer to FIG. 1 illustrating a flowchart of a first control method for vehicle driving according to one embodiment of the present disclosure. The control method for vehicle driving can be applied to mobile terminals, such as terminals, tablet computers, notebook computers, handheld computers, and portable media players (PMP), as well as fixed terminals, such as desktop computers. The flow of the vehicle driving control method may be as follows:

At block 101, acquiring a position information of a vehicle to be communicated within a preset distance range during a driving process of the vehicle.

During the driving process of the vehicle, the position information of the vehicle to be communicated within the preset distance range can be acquired. The preset distance range refers to the area near the current vehicle during the current vehicle driving process. For example, the preset distance range may refer to the starting point of the current vehicle position covering a range of 100 meters ahead, and other division methods.

After the preset distance range is determined, position information of the vehicle to be communicated within the preset distance range may be acquired. The vehicle to be communicated may refer to a vehicle with a wireless communication function, and the vehicle may implement the wireless communication function by installing a wireless communication device.

For example, in a moving vehicle, its wireless communication device may be the driver's mobile phone or a wireless communication device installed in the vehicle itself, and the wireless communication device supports ultra-wideband (UWB) technology.

UWB realizes wireless transmission by sending and receiving extremely narrow pulses with nanoseconds or microseconds. Because the pulse time width is extremely short, ultra-wideband in the spectrum can be achieved, and the bandwidth used is above 500 megahertz (MHz). Since the time width of the UWB pulse is extremely short, high-precision timing can also be used for distance measurement. Compared with Wi-Fi and Bluetooth positioning technologies, UWB is provided with the following advantages: strong anti-multipath capability, high positioning accuracy, high timestamp precision, strong electromagnetic compatibility, and high energy efficiency. Based on the above technical advantages, the use of UWB can form a high-precision short-range positioning system and short-range communication. The position information of the vehicle to be communicated can be acquired through UWB technology.

The step of "acquiring a position information of a vehicle to be communicated within a preset distance range" comprises:

broadcasting a signal in an area within the preset distance range when the vehicle is driving; and receiving a signal response message, and determining the position information of the vehicle to be communicated according to the signal response message.

When the vehicle is driving, a signal can be broadcast to a nearby area within a preset distance range through the wireless communication device. The vehicle information within a preset distance can be acquired through broadcast signals.

After broadcasting the signal to the vehicle within the preset distance range, a response message made by another vehicle, that is, the vehicle to be communicated, to the broadcast signal can be received, and the position information of the vehicle to be communicated can be acquired according to the response message.

For example, when the vehicle is driving, the driver's mobile phone can broadcast a signal to a preset distance range near the vehicle through UWB, and then can receive a response message to the broadcast signal, and the position information of the vehicle to be communicated can be determined according to the response message, etc. By using UWB technology, more accurate vehicle position information can be acquired, which is beneficial to the driver's safe driving.

At block 102, determining a positional relationship with the vehicle to be communicated based on the positional information.

The positional relationship with the vehicle to be communicated is determined based on the positional information. The positional relationship may refer to the relative positional relationship between a driving vehicle and the vehicle to be communicated on the road. For example, the positional information may comprise the positional coordinates of the vehicle to be communicated. According to the positional coordinates of the driving vehicle and the positional coordinates of the vehicle to be communicated, the direction, angle, and distance difference between the two vehicles in the direction can be determined.

For example, according to the position information, it can be determined that the vehicle to be communicated is located 50 degrees to the left in front of the driving vehicle, and at a distance of 80 meters.

At block 103, determining a travel path of the vehicle to be communicated according to the positional relationship.

Specifically, the travel path of the vehicle to be communicated is determined according to the positional relationship. The travel path may refer to the travel path of the vehicle to be communicated after the vehicle has changed based on the current travel path.

The step of "determining a travel path of the vehicle to be communicated according to the positional relationship" comprises:

determining a current first lane and a second lane where the vehicle to be communicated is located based on the positional relationship;

determining a target driving direction of the vehicle to be communicated according to the first lane and the second lane;

acquiring of a first lane width of the first lane, a second lane width of the second lane, and a vehicle body width of the vehicle to be communicated;

determining a target driving distance of the vehicle to be communicated based on the first lane width, the second lane width, and the vehicle body width; and determining the travel path according to the target driving direction and the target driving distance.

Based on the positional relationship, the current first lane and the second lane where the vehicle to be communicated is determined, and the first lane may refer to the lane where the current driving vehicle is located. For example, the current road may comprise multiple lanes from left to right, which may be lane A, lane B, lane C, lane D, etc. Lane A and lane B may be driving lanes in the same direction, lane A and lane C may be driving lanes in the opposite direction, and lane C and lane D may be driving lanes in the same direction.

The first lane and the second lane are determined according to the positional relationship, the first lane where the driving vehicle is located can be determined by the position information of the driving vehicle, and then the second lane where the vehicle to be communicated can be determined according to the positional relationship between the driving vehicle and the vehicle to be communicated.

The first lane where the current driving vehicle is located may be lane A, and the positional relationship between the driving vehicle and the vehicle to be communicated may be: the vehicle to be communicated is located 45 degrees to the right in front of the driving vehicle, and at a distance of 50 meters, it can be determined that the second lane where the vehicle to be communicated is located may be lane B.

After the first lane and the second lane are determined, the target driving direction of the vehicle to be communicated may be determined according to the first lane and the second lane. For example, the first lane may be lane A, the second lane may be lane B, lane A and lane B are not in the same lane, and lane B is on the right side of lane A, then it can be determined that the driving direction of the vehicle to be communicated may be straight ahead, the right offset angle of the straight ahead direction, etc.

The first lane width of the first lane and the second lane width of the second lane are acquired. The first lane width may be the same as the second lane width, for example, the first lane width and the second lane width may be 3 meters. The body width of the vehicle to be communicated is acquired, for example, the body width may be 1.5 meters, etc.

For example, the current driving position of the vehicle to be communicated may be at the intersection edge of the second lane and the first lane, and it may be determined that the target driving distance of the vehicle to be communicated may be 1.5 meters. The target driving distance may refer to the change of the driving position of the vehicle to be communicated from the side of the current second lane near the first lane to the side far from the first lane, so as to make way for the driving vehicle.

After determining the driving direction of Mubao and the target driving distance, the travel path of the vehicle to be communicated can be determined, so that the vehicle to be communicated can drive according to the updated travel path, and the driving order of the vehicle can be maintained. In case of an emergency, it can quickly evade and save time.

The step of "determining a target driving direction of the vehicle to be communicated according to the first lane and the second lane" comprises:

determining whether the first lane and the second lane are the same lanes;

when the first lane and the second lane are the same lanes, acquiring a lane information of an adjacent lane of the first lane; and determining the target driving direction according to the lane information.

After determining the first lane where the driving vehicle is located and the second lane where the vehicle to be communicated is located, it can be determined whether the first lane and the second lane are the same lanes.

For example, the first lane can be lane A, and the second lane can be lane A, then it can be determined that the first lane and the second lane are the same lane, then the lane information of the adjacent lane of the first lane can be acquired, that is, the lane information of lane A can be acquired. The target driving direction of the vehicle to be communicated is determined according to the lane information of the adjacent lane of lane A.

The step of "determining the target driving direction according to the lane information" comprises:

acquiring an adjacent lane with the same driving direction as the first lane according to the lane information, and using the adjacent lane as a target driving lane of the vehicle to be communicated; and determining the target driving direction based on the adjacent lane.

After acquiring the lane information of the adjacent lane of the first lane, the adjacent lane to the first lane can be determined according to the lane information. Further, the adjacent lane with the same driving direction as the first lane can be determined from the adjacent lane, and the adjacent lane with the same driving direction as the first lane can be used as the target driving lane of the vehicle to be communicated.

For example, the first lane may be lane A, the adjacent lane of lane A may be lane B, and lane B may be a lane with the same driving direction as lane A, then lane B may be determined as the target driving lane of the vehicle to be communicated.

After the target driving lane is determined, the target driving direction of the vehicle to be communicated can be determined. For example, the current driving lane of the vehicle to be communicated is lane A, the target driving lane is lane B, and lane B can be located on the right side of lane A. It is determined that the driving direction of the vehicle to be communicated that needs to be changed is straight ahead and to the right, which is the target driving direction.

When the first lane where the driving vehicle is located is not the same as the second lane where the vehicle to be communicated is located, the driving direction changed by the vehicle to be communicated may be determined in other ways, which may comprise the following processes:

determining whether there is a driving vehicle in the first lane, if the first lane and the second lane are not the same lanes, where a position of the driving vehicle in the first lane is the same as a position of the vehicle to be communicated in the second lane; and when there is a driving vehicle in the first lane, acquiring an adjacent lane of the second lane, and determining the target driving direction according to the adjacent lane of the second lane.

When the first lane and the second lane are not the same lanes, it can be judged whether there is another driving vehicle in the first lane, and the position of the other driving vehicle and the position of the vehicle to be communicated can be in the same lateral position.

For example, the first lane where the driving vehicle is located may be lane A, and the second lane where the vehicle to be communicated may be located may be lane B. If there is another driving vehicle in lane A, the position of the other traveling vehicles in lane A is the same as that of the vehicle to be communicated in lane B. At this time, if the vehicle to be communicated wants to make way for the driving vehicle, it can acquire another adjacent lane, the other adjacent driving lane can be lane C, and the driving direction of lane C and lane B is opposite, then the vehicle to be communicated cannot change the driving lane and can only switch the driving direction. The driving direction can be changed to the right in the straight ahead direction, and the right in the straight ahead direction can be the target driving direction of the vehicle to be communicated.

Before the step of "determining a travel path of the vehicle to be communicated according to the positional relationship", which comprises:

determining whether a driving direction of a vehicle is the same as a driving direction of the vehicle to be communicated according to the positional relationship;

when the driving direction of a vehicle is the same as a driving direction of the vehicle to be communicated, determining whether the vehicle is at the rear position of the vehicle to be communicated;

determining the travel path of the vehicle to be communicated according to the positional relationship is the execution step if the vehicle is at the rear position of the vehicle to be communicated.

After determining the positional relationship between the driving vehicle and the vehicle to be communicated, it can be determined whether the driving direction of the vehicle to be communicated is the same as the driving direction of the driving vehicle.

Whether the vehicle to be communicated is located in front of the driving vehicle, that is, whether the driving vehicle is behind the vehicle to be communicated, if the driving vehicle is located behind the vehicle to be communicated, it can continue to perform the step of "determining a travel path of the vehicle to be communicated according to the positional relationship". The solution of the present disclosure is mainly used to send an avoidance signal to the vehicle to be communicated, which is located in front of the driving vehicle and whose driving direction is the same as the driving direction of the driving vehicle. Therefore, it is necessary to judge the vehicle coupling that has received the response information, and unnecessary operations can be avoided.

For example, the position of the driving vehicle may be lane C, the position of the vehicle to be communicated may be lane D with the same driving direction as lane C, and the vehicle to be communicated is located in front of the driving vehicle, then the step of "determining a travel path of the vehicle to be communicated according to the positional relationship" can be executed. For another example, the position of the driving vehicle may be lane C, the position of the vehicle to be communicated may be lane D with the same driving direction as lane C, and the vehicle to be communicated may be located at the rear of the driving vehicle, so there is no need to communicate with the vehicle to be communicated. The information of the vehicle is processed, and the vehicle to be communicated can continue to drive in the original driving direction.

At block 104, sending a communication instruction to the vehicle to be communicated, so that the vehicle to be communicated travels according to the travel path.

After the travel path of the vehicle to be communicated is determined, a signal can be sent to the vehicle to be communicated, and a communication instruction can be carried, so that the vehicle to be communicated can change the travel path according to the communication instruction, thereby giving way to the driving vehicle in advance.

An embodiment of the present disclosure is directed to a method for controlling a vehicle driving. The method includes: acquiring a position information of a vehicle to be communicated within a preset distance range during a driving process of the vehicle; determining a positional relationship with the vehicle to be communicated based on the positional information; determining a travel path of the vehicle to be communicated according to the positional relationship; and sending a communication instruction to the vehicle to be communicated, so that the vehicle to be communicated travels according to the travel path. In the present disclosure, the position information of the vehicle ahead can be acquired in real-time during the driving process of the vehicle. In case of an emergency, it can communicate with the vehicle ahead in advance to change the original travel path, thereby effectively improving the driving efficiency of the vehicle while ensuring driving safety.

Figure 2:
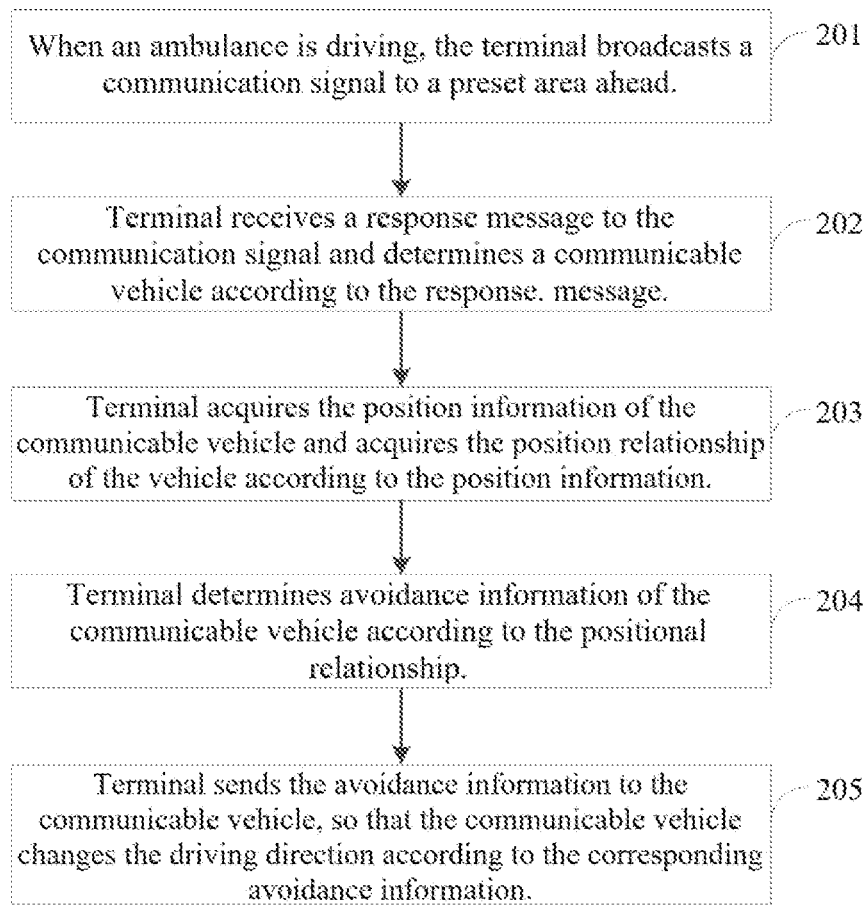
FIG. 2 is a flowchart of a second control method for vehicle driving according to one embodiment of the present disclosure.

Please refer to FIG. 2, which is a flowchart of a second control method for vehicle driving according to one embodiment of the present disclosure. The vehicle driving control method can be applied to the ambulance when the ambulance evades, and a terminal device supporting wireless communication may exist in the ambulance. Specific scenarios can be applied as follows:

At block 201, when the ambulance is driving, the terminal broadcasts a communication signal to a preset area ahead.

When the ambulance is driving on a crowded road with many vehicles, the vehicle ahead needs to adjust the driving direction and change the travel path. The embodiment of the present disclosure ensures that the ambulance has moved away in advance, so that the ambulance can pass at a high speed on a crowded road by using the UWB technology based inductive ambulance and the communication mechanism of timely and automatic avoidance.

When the ambulance is driving, the communication signal can be broadcast to the preset area ahead, and the preset area ahead can be determined according to the strength of the communication signal and the road conditions. For example, in order to ensure the accuracy of acquiring the vehicle position, the preset range may be within 100 meters in front of the ambulance during driving. The terminal can broadcast a communication signal to a range of 100 meters ahead, wherein the range of 100 meters ahead can be the same lane as the driving direction of the ambulance.

For example, the driving lane where the ambulance is located may be the first driving lane, the lane with the same driving direction as the first driving lane may comprise the second driving lane, and the preset area may be an area 100 meters in front of the ambulance covering the first driving lane and the second driving lane.

At block 202, the terminal receives a response message to the communication signal and determines a communicable vehicle according to the response message.

After the terminal broadcasts the signal, if there is a vehicle supporting wireless communication in the preset area, it can respond to the broadcast signal. The terminal may receive a response message, the response message may comprise a device identifier, and the terminal may determine a vehicle ahead that can communicate according to the device identifier.

For example, the terminal broadcasts a signal to the preset area, and receives a response message of the broadcast signal. The response message may comprise multiple device identifiers, and the communicable vehicle may be determined according to the device identifiers.

At block 203, the terminal acquires the position information of the communicable vehicle and acquires the position relationship of the vehicle according to the position information.

After determining the communicable vehicle, the terminal can acquire the position information of the communicable vehicle, and acquire the position information through UWB technology. After the location information of the communicable vehicle is acquired, the location relationship between the ambulance and the communicable vehicle can be acquired according to the location information. Please refer to FIG. 3, which is a schematic plan view of a positional relationship of a vehicle driving according to one embodiment of the present disclosure.

Figure 3:
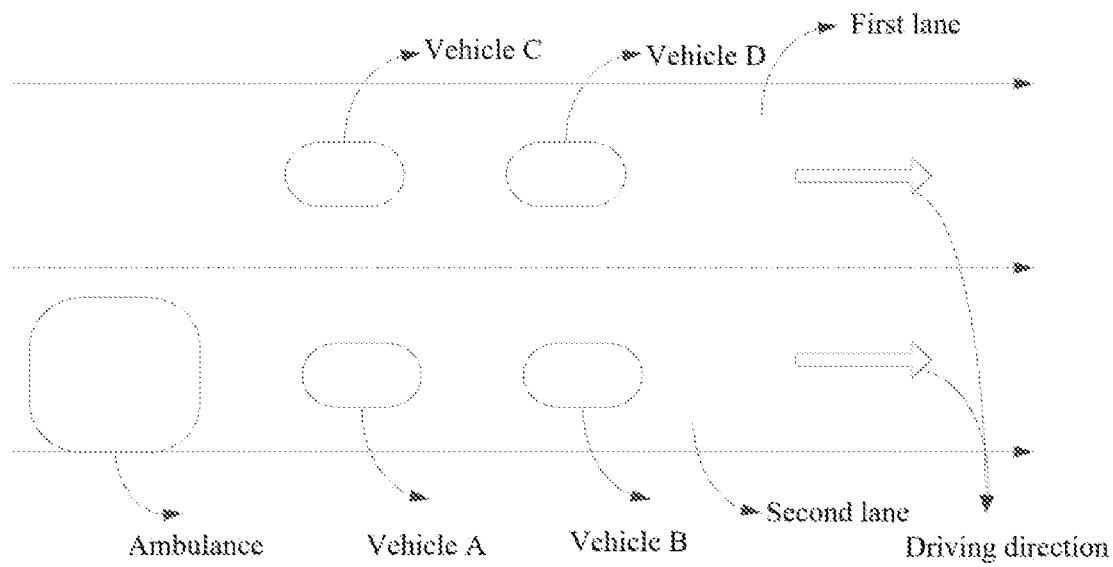
FIG. 3 illustrates a positional relationship of a vehicle according to one embodiment of the present disclosure.

As shown in FIG. 3, the ambulance is currently driving in the second lane, and the communicable vehicles driving in front of the ambulance may be vehicle A, vehicle B, vehicle C, and vehicle D. Among them, vehicle A and vehicle B are located in the second lane and drive directly in front of the ambulance, while vehicle C and vehicle D are located in the first lane and drive in the left front of the ambulance. The first lane and the second lane may be in the same driving direction.

At block 204, the terminal determines avoidance information of the communicable vehicle according to the positional relationship.

After determining the positional relationship between the ambulance and the vehicle to be communicated, the terminal may determine avoidance information corresponding to the communicable vehicle, and the avoidance information may comprise the avoidance direction and the like.

Please refer to FIG. 3. Vehicle A and vehicle B are driving directly in front of the ambulance at this time, then vehicle A and vehicle B can avoid the ambulance by changing the current driving direction, and it can be determined that the avoidance direction of vehicle A and vehicle B can be to the right. Vehicle C and vehicle D drive in the left front of the ambulance. Vehicle C and vehicle D can avoid the rear ambulance by changing the current driving direction to the left.

At block 205, the terminal sends the avoidance information to the communicable vehicle, so that the communicable vehicle changes the driving direction according to the corresponding avoidance information.

After determining the avoidance information of the communicable vehicle according to the positional relationship, the terminal may send the avoidance information to the corresponding communicable vehicle.

For example, if the avoidance information corresponding to vehicle A and vehicle B is driving to the right, the terminal can send the communication instruction corresponding to driving to the right to vehicle A and vehicle B. If the avoidance information corresponding to the vehicle C and the vehicle D is driving to the left, the terminal may send the communication instruction corresponding to driving to the left to vehicle C and vehicle D.

Figure 4:
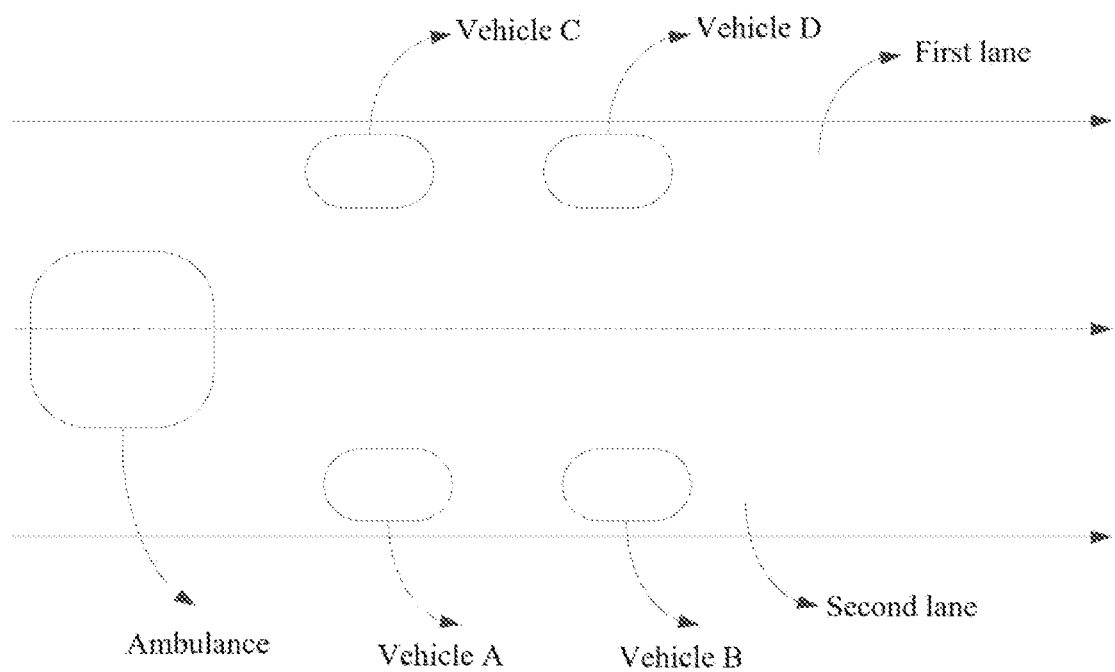
FIG. 4 illustrates a vehicle position after updating a driving direction according to one embodiment of the present disclosure.

After the communicable vehicle receives the command signal, the current driving direction can be changed according to the instruction, and the positional relationship of each vehicle on the current road can be acquired. Please refer to FIG. 4, which is a schematic plan view of a vehicle position after updating a driving direction according to one embodiment of the present disclosure. In FIG. 4, vehicle A, vehicle B, vehicle C, and vehicle D are respectively adjusted according to the driving direction corresponding to the instruction to quickly empty the middle passage, so that the ambulance can move forward smoothly, greatly saving the time for the ambulance to evade.

The embodiment of the present disclosure is directed to a control method for vehicle driving. The method includes: acquiring a position information of a vehicle to be communicated within a preset distance range during a driving process of the vehicle; determining a positional relationship with the vehicle to be communicated based on the positional information; determining a travel path of the vehicle to be communicated according to the positional relationship; and sending a communication instruction to the vehicle to be communicated, so that the vehicle to be communicated travels according to the travel path. In the present disclosure, the position information of the vehicle ahead can be acquired in real-time during the driving process of the vehicle. In case of an emergency, it can communicate with the vehicle ahead in advance to change the original travel path, thereby effectively improving the driving efficiency of the vehicle while ensuring driving safety.

In order to facilitate better implementation of the vehicle driving control method provided by the embodiments of the present disclosure, an embodiment of the present disclosure further provides a device based on the above-mentioned vehicle driving control method. The meanings of the nouns are the same as those in the above-mentioned vehicle driving control method, and the specific implementation details may refer to the description in the method embodiment.

Figure 5:
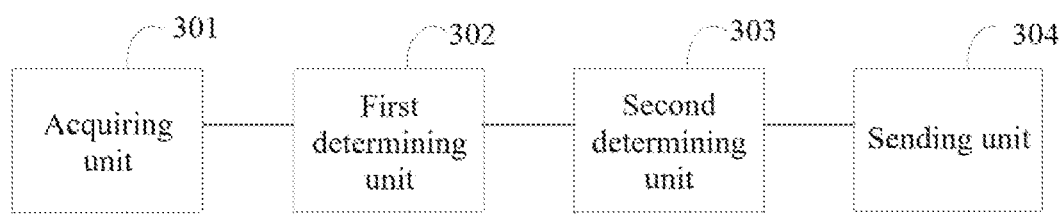
FIG. 5 is a block diagram of a vehicle driving control device according to one embodiment of the present disclosure.

Please refer to FIG. 5 illustrating a block diagram of a vehicle driving control device according to one embodiment of the present disclosure. The vehicle driving control device can be applied to mobile terminals, such as terminals, tablet computers, notebook computers, handheld computers, and portable media players (PMP), as well as fixed terminals, such as desktop computers. The device comprises an acquiring unit 301, a first determining unit 302, a second determining unit 303, and a sending unit 304.

The acquiring unit 301 is configured to acquire the position information of the vehicle to be communicated within a preset distance range during the driving process of the vehicle.

The first determining unit 302 is configured to determine a positional relationship with the vehicle to be communicated based on the positional information.

The second determining unit 303 is configured to determine the travel path of the vehicle to be communicated according to the positional relationship.

The sending unit 304 is configured to send a communication instruction to the vehicle to be communicated, so that the vehicle to be communicated travels according to the travel path.

The second determining unit 303 comprises a first determination subunit, a second determination subunit, an acquiring subunit, a third determination subunit, and a fourth determining unit.

The first determination subunit is configured to determine the current first lane and the second lane where the vehicle to be communicated is located based on the positional relationship.

The second determination subunit is configured to determine the target driving direction of the vehicle to be communicated according to the first lane and the second lane.

The acquiring subunit is configured to acquire the first lane width of the first lane, the second lane width of the second lane, and the body width of the vehicle to be communicated.

The third determination subunit is configured to determine the target driving distance of the vehicle to be communicated based on the first lane width, the second lane width, and the vehicle body width.

The fourth determining unit is configured to determine the travel path according to the target driving direction and the target driving distance.

The second determining subunit may be specifically used for: determining whether the first lane and the second lane are the same lanes; if so, acquiring the lane information of the adjacent lane of the first lane; acquiring an adjacent lane with the same driving direction as the first lane according to the lane information, and using the adjacent lane as the target driving lane of the vehicle to be communicated; and determining the target driving direction based on the adjacent lane.

The second determination subunit may also be specifically configured to: determining whether there is a driving vehicle in the first lane if the first lane and the second lane are not the same lanes, and the driving vehicle is in the first lane, the position of the lane is the same as the position of the vehicle to be communicated in the second lane; if so, the adjacent lane of the second lane may be acquired, and the target driving direction may be determined according to the adjacent lane of the second lane.

The acquiring unit 301 comprises a broadcasting subunit and a receiving subunit.

The broadcasting subunit is used for broadcasting signals in the area within the preset distance range when the vehicle is driving.

The receiving subunit is used for receiving a signal response message and determining the position information of the vehicle to be communicated according to the signal response message.

The control device for vehicle driving further comprise a judging unit, a first execution unit, and a second execution unit.

The judging unit is used for determining whether it is the same as the driving direction of the vehicle to be communicated according to the positional relationship.

The first execution unit is configured to determine whether it is behind the vehicle to be communicated.

The second execution unit is configured to execute the step of determining the travel path of the vehicle to be communicated according to the positional relationship if the vehicle is behind the vehicle to be communicated.

The embodiment of the present disclosure is directed to a control device for vehicle driving. The solution of the present disclosure acquires the position information of the vehicle ahead can be acquired in real-time during the driving process of the vehicle. In case of an emergency, it can communicate with the vehicle ahead in advance to change the original travel path, thereby effectively improving the driving efficiency of the vehicle while ensuring driving safety.

Figure 6:
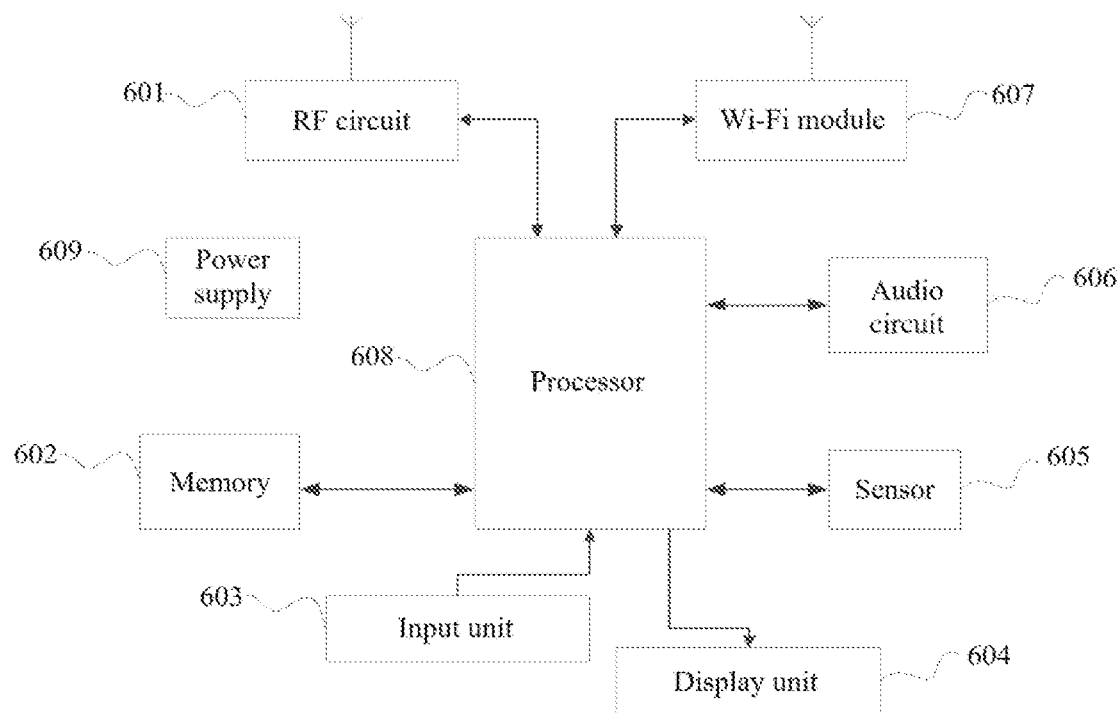
FIG. 6 is a structural diagram of a terminal according to one embodiment of the present disclosure.

An embodiment of the present disclosure is also directed to a terminal. As shown in FIG. 6, the terminal may comprise a radio frequency (RF) circuit 601, a memory 602 including one or more storage media, an input unit 603, a display unit 604, a sensor 605, an audio circuit 606, a Wi-Fi module 607, a processor 608 including one or more processing cores, and a power supply 609.

The RF circuit 601 may be configured to receive and send a signal during an information receiving and sending process or a conversation process. Specifically, after receiving downlink information from a base station, the RF circuit 601 delivers the downlink information to one or more processors 608 for processing, and sends related uplink data to the base station. Generally, the RF circuit 601 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 601 may also communicate with a network and another device by wireless communication. The wireless communication may use any communications standard or protocol, which includes, but is not limited to, a Global System for Mobile communications (GSM), an Enhanced Data GSM Environment (EDGE), a Wideband Code Division Multiple Access (WCDMA), a Code Division Access (CDMA), a Time Division Multiple Access (TDMA), a Wireless Fidelity (Wi-Fi) such as IEEE 802.11a, IEEE 802.11b, IEEE802.11g and IEEE 802.11n, a Voice over Internet Protocol (VoIP), a Worldwide Interoperability for Microwave Access (Wi-Max), any other protocols for e-mail, instant communication and short message, and the like.

The memory 602 may be configured to store a software program and module. The processor 608 runs the software program and module stored in the memory 602, to implement various functional applications and data processing. The memory 602 may mainly include a program storage area and a data storage area. The program storage area may store an operating system, an application program required by at least one function (such as a sound playback function and an image display function), and the like. The data storage area may store data (such as audio data and an address book) created according to use of the mobile terminal, and the like. In addition, the memory 602 may include a high speed random access memory, and may also include a non-volatile memory, such as at least one magnetic disk memory, a flash memory device, or another volatile solid-state memory. Correspondingly, the memory 602 may further include a memory controller, so that the processor 608 and the input unit 603 access the memory 602.

The input unit 603 may be configured to receive input digit or character information, and generate keyboard, mouse, joystick, optical, or track ball signal input related to the user setting and function control. Specifically, the input unit 603 may include a touch-sensitive surface and other input device. The touch-sensitive surface may also be referred to as a touch screen or a touch panel, and may collect a touch operation of a user on or near the touch-sensitive surface (such as an operation of a user on or near the touch-sensitive surface by using any suitable object or attachment, such as a finger or a stylus), and drive a corresponding connection apparatus according to a preset program. Optionally, the touch-sensitive surface may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 608. Moreover, the touch controller can receive and execute a command sent from the processor 608. In addition, the touch-sensitive surface may be implemented by using various types, such as a resistive type, a capacitance type, an infrared type, and a surface sound wave type. In addition to the touch-sensitive surface, the input unit 603 may further include the another input device. Specifically, the another input device may include, but is not limited to, one or more of a physical keyboard, a functional key (such as a volume control key or a switch key), a track ball, a mouse, and a joystick.

The display unit 604 may be configured to display information input by the user or information provided for the user, and various graphical user ports of the mobile terminal. The graphical user ports may be formed by a graph, a text, an icon, a video, and any combination thereof. The display unit 604 may include a display panel. Optionally, the display panel may be configured by using a liquid crystal display (LCD), an organic light-emitting diode (OLED), or the like. Further, the touch-sensitive surface may cover the display panel. After detecting a touch operation on or near the touch-sensitive surface, the touch-sensitive surface transfers the touch operation to the processor 608, so as to determine a type of a touch event. Then, the processor 608 provides corresponding visual output on the display panel according to the type of the touch event. Although, in FIG. 8, the touch-sensitive surface and the display panel are used as two separate parts to implement input and output functions, in some embodiments, the touch-sensitive surface and the display panel may be integrated to implement the input and output functions.

The mobile terminal may further include at least one sensor 605, such as an optical sensor, a motion sensor, and other sensors. Specifically, the optical sensor may include an ambient light sensor and a proximity sensor. The ambient light sensor may adjust luminance of the display panel according to brightness of the ambient light. The proximity sensor may switch off the display panel and/or backlight when the mobile terminal is moved to the ear. As one type of motion sensor, a gravity acceleration sensor may detect magnitude of accelerations at various directions (which generally are triaxial), may detect magnitude and a direction of the gravity when static, and may be configured to identify an application of a mobile phone attitude (such as switching between horizontal and vertical screens, a related game, and attitude calibration of a magnetometer), a related function of vibration identification (such as a pedometer and a knock). Other sensors, such as a gyroscope, a barometer, a hygrometer, a thermometer, and an infrared sensor, which may be configured in the mobile terminal are not further described herein.

The audio circuit 606, a loudspeaker, and a microphone may provide audio interfaces between the user and the mobile terminal. The audio circuit 606 may transmit, to the loudspeaker, a received electric signal converted from received audio data. The loudspeaker converts the electric signal into a sound signal for output. On the other hand, the microphone converts a collected sound signal into an electric signal. The audio circuit 606 receives the electric signal and converts the electric signal into audio data, and outputs the audio data to the processor 608 for processing. Then, the processor 608 sends the audio data to, for example, another terminal by using the RF circuit 601, or outputs the audio data to the memory 602 for further processing. The audio circuit 606 may further include an earplug jack, so as to provide communication between a peripheral earphone and the mobile terminal.

The mobile terminal may help, by using the transmission module 607 (e.g. Wi-Fi module), a user to receive and send an e-mail, browse a webpage, and access stream media, and the like, which provides wireless broadband Internet access for the user. Although FIG. 8 shows the transmission module 607, it may be understood that, the wireless communications unit is not a necessary component of the mobile terminal, and can be ignored according to demands without changing the scope of the essence of the present disclosure.

The processor 608 is a control center of the mobile terminal, and connects various parts of the terminal by using various interfaces and lines. By running or executing the software program and/or module stored in the memory 602, and invoking data stored in the memory 602, the processor 608 performs various functions and data processing of the mobile terminal, thereby performing overall monitoring on the mobile phone. Optionally, the processor 608 may include one or more processing cores. Preferably, the processor 608 may integrate an application processor and a modem. The application processor mainly processes an operating system, a user interface, an application program, and the like. The modem mainly processes wireless communication. It may be understood that, the foregoing modem may not be integrated into the processor 608.

The mobile terminal further includes the power supply 609 (such as a battery) for supplying power to the components. Preferably, the power supply may be logically connected to the processor 608 by using a power supply management system, thereby implementing functions, such as charging, discharging, and power consumption management, by using the power supply management system. The power supply 609 may further include any component, such as one or more direct current or alternate current power supplies, a re-charging system, a power supply fault detection circuit, a power supply converter or an inverter, and a power supply state indicator.

The processor 608 in the terminal loads the executable files corresponding to the processes of one or more application programs into the memory 602 according to the following instructions, and the processor 608 runs the application programs stored in the memory 602, thereby implementing various operations comprising:

acquiring a position information of a vehicle to be communicated within a preset distance range during a driving process of the vehicle;

determining a positional relationship with the vehicle to be communicated based on the positional information;

determining a travel path of the vehicle to be communicated according to the positional relationship; and sending a communication instruction to the vehicle to be communicated, so that the vehicle to be communicated travels according to the travel path.

The embodiments of the present disclosure are directed to a control method, a device, a storage medium, and a terminal for vehicle driving. The method for controlling vehicle driving applied to a terminal includes: acquiring a position information of a vehicle to be communicated within a preset distance range during a driving process of the vehicle; determining a positional relationship with the vehicle to be communicated based on the positional information; determining a travel path of the vehicle to be communicated according to the positional relationship; and sending a communication instruction to the vehicle to be communicated, so that the vehicle to be communicated travels according to the travel path.

The solution of the present disclosure acquires the position information of the vehicle ahead can be acquired in real-time during the driving process of the vehicle. In case of an emergency, it can communicate with the vehicle ahead in advance to change the original travel path, thereby effectively improving the driving efficiency of the vehicle while ensuring driving safety.

Those skilled in the art can understand that all or part of the steps in the various methods of the above embodiments can be completed by instructions, or by instructions controlling related hardware. The instructions can be stored in a storage medium and loaded and executed by a processor.

To this end, the embodiments of the present disclosure are directed to a storage medium in which a plurality of instructions are stored, and the instructions can be loaded by a processor to execute the operations comprising: acquiring a position information of a vehicle to be communicated within a preset distance range during a driving process of the vehicle; determining a positional relationship with the vehicle to be communicated based on the positional information; determining a travel path of the vehicle to be communicated according to the positional relationship; and sending a communication instruction to the vehicle to be communicated, so that the vehicle to be communicated travels according to the travel path.

The storage medium may include: Read Only Memory (ROM), Random Access Memory (RAM), magnetic disk or optical disk, etc.

Because of the instructions stored in the storage medium, the steps in any of the vehicle driving control methods provided by the embodiments of the present application can be executed, and therefore, any vehicle driving control methods provided by the embodiments of the present application can be implemented. For the beneficial effects that can be achieved, refer to the foregoing embodiments for details, which will not be repeated here.

In this specification, specific examples are applied to explain the principle and implementation of the present disclosure. The description of the above embodiments is only used to help understand the method and core idea of the present disclosure; meanwhile, for those skilled in the art, there will be changes in the specific implementation mode and application scope according to the idea of the present disclosure. To sum up, the contents of this specification should not be construed as limiting the present disclosure.

What is claimed is:

1. A method for controlling vehicle driving applied to a terminal, comprising:
    a step of acquiring a position information of a vehicle to be communicated within a preset distance range of a current vehicle during a driving process of the current vehicle;
    a step of determining a positional relationship with the vehicle to be communicated based on the positional information;
    a step of determining a travel path of the vehicle to be communicated according to the positional relationship; and
    a step of sending a communication instruction to the vehicle to be communicated, so that the vehicle to be communicated travels according to the travel path;
wherein when the vehicle is driving, a driver's mobile phone transmits a broadcast signal to a preset distance range near the vehicle through UWB, and then receives a response message to the broadcast signal, and the position information of the vehicle to be communicated is determined according to the response message, a current driving position of the vehicle to be communicated is at an intersection edge of a second lane and a first lane, and a target driving distance of the vehicle to be communicated is determined, the target driving distance refers to a change of the driving position of the vehicle to be communicated from a side of the second lane near the first lane to a side far from the first lane.

2. The method as claimed in claim 1, wherein the step of determining a travel path of the vehicle to be communicated according to the positional relationship comprises:
    a step of determining a current first lane and a second lane where the vehicle to be communicated is located based on the positional relationship;
    a step of determining a target driving direction of the vehicle to be communicated according to the first lane and the second lane;
    a step of acquiring of a first lane width of the first lane, a second lane width of the second lane, and a vehicle body width of the vehicle to be communicated;
    a step of determining a target driving distance of the vehicle to be communicated based on the first lane width, the second lane width, and the vehicle body width; and
    a step of determining the travel path according to the target driving direction and the target driving distance.

3. The method as claimed in claim 2, wherein the step of determining a target driving direction of the vehicle to be communicated according to the first lane and the second lane comprises:
    a step of determining whether the first lane and the second lane are the same lane;
    a step of acquiring a lane information of an adjacent lane of the first lane when the first lane and the second lane are the same lane; and
    a step of determining the target driving direction according to the lane information.

4. The method as claimed in claim 3, wherein the step of determining the target driving direction according to the lane information comprises:
    a step of acquiring an adjacent lane with the same driving direction as the first lane according to the lane information, and using the adjacent lane as a target driving lane of the vehicle to be communicated; and
    a step of determining the target driving direction based on the adjacent lane.

5. The method as claimed in claim 3, further comprising:
    a step of determining whether there is a driving vehicle in the first lane, when the first lane and the second lane are not the same lane, wherein a position of the driving vehicle in the first lane is the same as a position of the vehicle to be communicated in the second lane; and
    a step of when there is a driving vehicle in the first lane, acquiring an adjacent lane of the second lane, and determining the target driving direction according to the adjacent lane of the second lane.

6. The method as claimed in claim 1, wherein the step of acquiring a position information of a vehicle to be communicated within a preset distance range comprises:
    a step of broadcasting a signal in an area within the preset distance range when the vehicle is driving; and
    a step of receiving a signal response message, and determining the position information of the vehicle to be communicated according to the signal response message.

7. The method as claimed in claim 1, wherein before the step of determining a travel path of the vehicle to be communicated according to the positional relationship, the method further comprises:
    a step of determining whether a driving direction of a vehicle is the same as a driving direction of the vehicle to be communicated according to the positional relationship;
    a step of determining whether the vehicle is at the rear position of the vehicle to be communicated when the driving direction of the vehicle is the same as the driving direction of the vehicle to be communicated; and
    a step of determining the travel path of the vehicle to be communicated according to the positional relationship is the execution step, when the vehicle is at the rear position of the vehicle to be communicated.

8. A non-transitory storage medium, storing a plurality of instructions, wherein the instructions are executed by a processor to perform operations comprising:
    acquiring a position information of a vehicle to be communicated within a preset distance range of a current vehicle during a driving process of the current vehicle;
    determining a positional relationship with the vehicle to be communicated based on the positional information;
    determining a travel path of the vehicle to be communicated according to the positional relationship; and
    sending a communication instruction to the vehicle to be communicated, so that the vehicle to be communicated travels according to the travel path;
    wherein when the vehicle is driving, a driver's mobile phone transmits a broadcast signal to a preset distance range near the vehicle through UWB, and then receives a response message to the broadcast signal, and the position information of the vehicle to be communicated is determined according to the response message, a current driving position of the vehicle to be communicated is at an intersection edge of a second lane and a first lane, and a target driving distance of the vehicle to be communicated is determined, the target driving distance refers to a change of the driving position of the vehicle to be communicated from a side of the second lane near the first lane to a side far from the first lane.

9. The non-transitory storage medium as claimed in claim 8, wherein the operation of determining a travel path of the vehicle to be communicated according to the positional relationship comprises:
   determining a current first lane and a second lane where the vehicle to be communicated is located based on the positional relationship;
   determining a target driving direction of the vehicle to be communicated according to the first lane and the second lane;
   acquiring of a first lane width of the first lane, a second lane width of the second lane, and a vehicle body width of the vehicle to be communicated;
   determining a target driving distance of the vehicle to be communicated based on the first lane width, the second lane width, and the vehicle body width; and
   determining the travel path according to the target driving direction and the target driving distance.

10. The non-transitory storage medium as claimed in claim 9, wherein the operation of determining a target driving direction of the vehicle to be communicated according to the first lane and the second lane comprises:
    determining whether the first lane and the second lane are the same lane;
    when the first lane and the second lane are the same lane, acquiring a lane information of an adjacent lane of the first lane; and
    determining the target driving direction according to the lane information.

11. The non-transitory storage medium as claimed in claim 10, wherein the operation of determining the target driving direction according to the lane information comprises:
    acquiring an adjacent lane with the same driving direction as the first lane according to the lane information, and using the adjacent lane as a target driving lane of the vehicle to be communicated; and
    determining the target driving direction based on the adjacent lane.

12. The non-transitory storage medium as claimed in claim 10, wherein the operations further comprise:
    determining whether there is a driving vehicle in the first lane, when the first lane and the second lane are not the same lane, wherein a position of the driving vehicle in the first lane is the same as a position of the vehicle to be communicated in the second lane; and
    when there is a driving vehicle in the first lane, acquiring an adjacent lane of the second lane, and determining the target driving direction according to the adjacent lane of the second lane.

13. The non-transitory storage medium as claimed in claim 8, wherein the operation of acquiring a position information of a vehicle to be communicated within a preset distance range comprises:
    broadcasting a signal in an area within the preset distance range when the vehicle is driving; and
    receiving a signal response message, and determining the position information of the vehicle to be communicated according to the signal response message.

14. The non-transitory storage medium as claimed in claim 8, wherein before the operation of determining a travel path of the vehicle to be communicated according to the positional relationship, the method further comprises:
    determining whether a driving direction of a vehicle is the same as a driving direction of the vehicle to be communicated according to the positional relationship;
    when the driving direction of the vehicle is the same as the driving direction of the vehicle to be communicated, determining whether the vehicle is at the rear position of the vehicle to be communicated; and
    determining the travel path of the vehicle to be communicated according to the positional relationship is the execution step, when the vehicle is at the rear position of the vehicle to be communicated.

15. A terminal, comprising a processor and a memory storing a plurality of instructions, wherein the instructions are executed by the processor to perform operations comprising:
    acquiring a position information of a vehicle to be communicated within a preset distance range of a current vehicle during a driving process of the current vehicle;
    determining a positional relationship with the vehicle to be communicated based on the positional information;
    determining a travel path of the vehicle to be communicated according to the positional relationship; and
    sending a communication instruction to the vehicle to be communicated, so that the vehicle to be communicated travels according to the travel path;
    wherein when the vehicle is driving, a driver's mobile phone transmits a broadcast signal to a preset distance range near the vehicle through UWB, and then receives a response message to the broadcast signal, and the position information of the vehicle to be communicated is determined according to the response message, a current driving position of the vehicle to be communicated is at an intersection edge of a second lane and a first lane, and a target driving distance of the vehicle to be communicated is determined, the target driving distance refers to a change of the driving position of the vehicle to be communicated from a side of the second lane near the first lane to a side far from the first lane.

16. The terminal as claimed in claim 15, wherein the operation of determining a travel path of the vehicle to be communicated according to the positional relationship comprises:
    determining a current first lane and a second lane where the vehicle to be communicated is located based on the positional relationship;
    determining a target driving direction of the vehicle to be communicated according to the first lane and the second lane;
    acquiring of a first lane width of the first lane, a second lane width of the second lane, and a vehicle body width of the vehicle to be communicated;
    determining a target driving distance of the vehicle to be communicated based on the first lane width, the second lane width, and the vehicle body width; and
    determining the travel path according to the target driving direction and the target driving distance.

17. The terminal as claimed in claim 16, wherein the operation of determining a target driving direction of the vehicle to be communicated according to the first lane and the second lane comprises:
    determining whether the first lane and the second lane are the same lane;
    when the first lane and the second lane are the same lane, acquiring a lane information of an adjacent lane of the first lane; and
    determining the target driving direction according to the lane information.

18. The terminal as claimed in claim 17, wherein the operation of determining the target driving direction according to the lane information comprises:
- acquiring an adjacent lane with the same driving direction as the first lane according to the lane information, and using the adjacent lane as a target driving lane of the vehicle to be communicated; and
- determining the target driving direction based on the adjacent lane.

19. The terminal as claimed in claim 17, wherein the operations further comprise:
- determining whether there is a driving vehicle in the first lane, when the first lane and the second lane are not the same lane, wherein a position of the driving vehicle in the first lane is the same as a position of the vehicle to be communicated in the second lane; and
- when there is a driving vehicle in the first lane, acquiring an adjacent lane of the second lane, and determining the target driving direction according to the adjacent lane of the second lane.

20. The terminal as claimed in claim 15, wherein the operation of acquiring a position information of a vehicle to be communicated within a preset distance range comprises:
- broadcasting a signal in an area within the preset distance range when the vehicle is driving; and
- receiving a signal response message, and determining the position information of the vehicle to be communicated according to the signal response message.

* * * * *